(12) United States Patent
Foster et al.

(10) Patent No.: US 12,546,351 B2
(45) Date of Patent: Feb. 10, 2026

(54) EXTENDIBLE POLES

(71) Applicant: WOODLAND TOOLS, INC., Madison, WI (US)

(72) Inventors: Charlton G. A. Foster, Middleton, WI (US); James W. Meiller, Fitchburg, WI (US)

(73) Assignee: Woodland Tools, Inc., Madison, WI (US)

( * ) Notice: Subject to any disclaimer, the term of this patent is extended or adjusted under 35 U.S.C. 154(b) by 417 days.

(21) Appl. No.: 18/172,726

(22) Filed: Feb. 22, 2023

(65) Prior Publication Data
US 2024/0052865 A1    Feb. 15, 2024

Related U.S. Application Data

(60) Provisional application No. 63/398,136, filed on Aug. 15, 2022.

(51) Int. Cl.
*F16B 7/10* (2006.01)
*B25G 1/04* (2006.01)

(52) U.S. Cl.
CPC . *F16B 7/10* (2013.01); *B25G 1/04* (2013.01)

(58) Field of Classification Search
CPC .................................. B25G 1/04; F16B 7/10
USPC ........................................................ 52/514
See application file for complete search history.

(56) References Cited

U.S. PATENT DOCUMENTS

| | | | | |
|---|---|---|---|---|
| 4,325,157 A * | 4/1982 | Balint | ...................... | B25G 1/04 15/230.11 |
| 4,653,142 A * | 3/1987 | Upton | ...................... | A47L 13/24 403/350 |
| 5,515,574 A * | 5/1996 | Larson | ...................... | B25G 1/04 15/144.4 |
| 5,893,196 A * | 4/1999 | Tserng | ................. | A45C 13/262 280/655 |
| 5,909,760 A * | 6/1999 | Tsai | ...................... | A45C 13/262 190/115 |
| 6,128,806 A * | 10/2000 | Shou-Mao | ........... | A45C 13/262 280/655 |
| 6,202,254 B1 * | 3/2001 | Ezer | ...................... | A45C 13/262 280/655 |
| 6,254,305 B1 * | 7/2001 | Taylor | ...................... | B25G 3/26 403/109.1 |
| 6,343,568 B1 * | 2/2002 | McClasky | .............. | A01K 31/14 119/428 |
| 6,668,423 B1 * | 12/2003 | Chen | .................... | A45C 13/262 16/113.1 |

(Continued)

*Primary Examiner* — James J Buckle, Jr.
(74) *Attorney, Agent, or Firm* — Yanjun Ma; Charles S. Sara; DeWitt LLP (57) ABSTRACT

Extendible poles that allow for increased hand fit and rigidity. The extendible pole comprises an outer pole and one or more inner poles slidably engaged within the outer pole. The outer pole and the one or more inner poles have a cross-sectional shape of an asymmetrical oval with five extended flat sides at an upper portion and a curved section at a lower portion, wherein the curved section does not contain any flat sides or contains three short flat sides. Alternatively, the one or more inner poles have a cross-sectional shape of an oval with two extended flat sides and three short flat sides at an upper portion and a curved section at a lower portion, wherein the curved section does not contain any flat sides or contains three short flat sides.

12 Claims, 9 Drawing Sheets

(56) References Cited

U.S. PATENT DOCUMENTS

| | | | | |
|---|---|---|---|---|
| 7,588,042 B2* | 9/2009 | Chang | A45B 19/04 | |
| | | | 135/25.4 | |
| 7,694,387 B1* | 4/2010 | Huang | B25G 1/04 | |
| | | | 16/113.1 | |
| 7,802,340 B2* | 9/2010 | Knopow | B25G 3/18 | |
| | | | 15/229.8 | |
| 7,877,837 B2* | 2/2011 | Gammack | A47L 9/0027 | |
| | | | 15/323 | |
| 8,683,657 B2* | 4/2014 | Lin | B25G 1/04 | |
| | | | 16/429 | |
| 10,041,624 B2* | 8/2018 | Christen | F16M 11/26 | |
| 11,028,963 B2* | 6/2021 | Hilleren | A47C 7/004 | |
| 2010/0210381 A1* | 8/2010 | White | A63B 71/0054 | |
| | | | 473/483 | |
| 2013/0119328 A1* | 5/2013 | Wu | A45C 13/262 | |
| | | | 254/134 | |
| 2014/0215738 A1* | 8/2014 | Hagans | A47L 13/42 | |
| | | | 16/110.1 | |
| 2015/0246440 A1* | 9/2015 | Balestrieri | B25G 1/04 | |
| | | | 81/489 | |
| 2016/0023347 A1* | 1/2016 | Ho | F16B 7/1454 | |
| | | | 16/429 | |
| 2018/0356032 A1* | 12/2018 | Crider | F16M 11/046 | |
| 2021/0396257 A1* | 12/2021 | Buckley | F16B 7/1427 | |
| 2022/0362926 A1* | 11/2022 | Gannon | B25J 18/025 | |
| 2023/0063067 A1* | 3/2023 | Lin | F16B 7/105 | |
| 2023/0234207 A1* | 7/2023 | Resh | B25G 3/18 | |
| | | | 81/489 | |
| 2024/0032742 A1* | 2/2024 | Harrington | B25G 1/04 | |

* cited by examiner

EXTENDIBLE POLES

CROSS-REFERENCE TO RELATED APPLICATION

The application claims priority to U.S. provisional application Ser. No. 63/398,136, filed Aug. 15, 2022, which is incorporated herein by reference in its entirety.

FIELD OF THE INVENTION

The present disclosure is directed to extendible poles, specifically extendible poles having the cross-sectional shape configured to an oval with flat sides.

BACKGROUND

Current extendible poles for a variety of use generally have a cross-sectional shape of oval, circular, rectangle, or square. These poles either do not fit the user's hand very well or lack rigidity. Thus, there is an unmet need in the art for extendible poles that are easy to grip, durable yet flexible enough to not snap.

SUMMARY OF THE INVENTION

Disclosed herein is an extendible pole that allows for increased hand fit and rigidity. The extendible pole comprises an outer pole and one or more inner poles slidably engaged within the outer pole.

The outer pole has a cross-sectional shape of an oval with five extended flat sides at an upper portion thereof and a curved section at a lower portion thereof, wherein a first and a second extended flat sides are on a left and a right side of the oval respectively and parallel with the major axis of the oval; a third extended flat side is on a top side of the oval and parallel with the minor axis of the oval; and a fourth and a fifth extended flat sides connect the third extended flat side with the first and the second extended flat sides respectively. Preferably, the fourth and the fifth extended flat sides of the outer pole connect the third extended flat side with the first and the second extended flat sides respectively with rounded corners.

In this cross-sectional shape of the outer pole, the first and the second extended flat sides are symmetrical with each other about the major axis of the oval, the fourth and the fifth extended flat sides are symmetrical with each other about the major axis of the oval, and the third extended flat side and the curved section are each symmetrical along the major axis of the oval, such that the cross-sectional shape of the outer pole is symmetrical about the major axis of the oval. In some embodiments, the curved section does not contain any flat sides, such that the cross-sectional shape of the outer pole is asymmetrical about the minor axis of the oval. In alternative embodiments, the curved section contains three short flat sides, wherein a first, a second, and a third flat sides are on a symmetrical position of the third, the fourth and the fifth extended flat sides respectively, relative to the minor axis of the oval; and the first, the second, and the third short flat sides are shorter than the third, the fourth, and the fifth extended flat sides respectively, such that the cross-sectional shape of the outer pole is asymmetrical about the minor axis of the oval.

In some embodiments, the one or more inner poles each has a cross-sectional shape of an oval with two extended flat sides and three short flat sides at an upper portion thereof and a curved section at a lower portion thereof, wherein a first and a second extended flat sides are on a left and a right side of the oval respectively and parallel with the major axis of the oval; a first short flat side is on a top side of the oval and parallel with the minor axis of the oval; a second and a third short flat sides are on curves connecting the first short flat side with the first and the second extended flat sides respectively; and the three short flat sides are shorter than the two extended flat sides.

In this cross-sectional shape of the one or more inner poles, the first and the second extended flat sides are symmetrical with each other about the major axis of the oval, the second and the third short flat sides are symmetrical with each other about the major axis of the oval, and the first short flat side and the curved section are each symmetrical along the major axis of the oval, such that the cross-sectional shape of the one or more inner poles is symmetrical about the major axis of the oval. In some embodiments, the curved section does not contain any flat sides, such that the cross-sectional shape of the one or more inner poles is asymmetrical about the minor axis of the oval. In alternative embodiments, the curved section contains three short flat sides, wherein a first, a second, and a third short flat sides of the curved section are symmetrical with the first, the second, and the third short flat sides of the upper portion respectively, relative to the minor axis of the oval, such that the cross-sectional shape of the one or more inner poles is symmetrical about the minor axis of the oval.

In some embodiments, the one or more inner poles each has a cross-sectional shape of an oval with five extended flat sides at an upper portion thereof and a curved section at a lower portion thereof, wherein a first and a second extended flat sides are on a left and a right side of the oval respectively and parallel with the major axis of the oval; a third extended flat side is on a top side of the oval and parallel with the minor axis of the oval; and a fourth and a fifth extended flat sides connect the third extended flat side with the first and the second extended flat sides respectively. Preferably, the fourth and the fifth extended flat sides connect the third extended flat side with the first and the second extended flat sides respectively with rounded corners.

In this cross-sectional shape of the one or more inner poles, the first and the second extended flat sides are symmetrical with each other about the major axis of the oval, the fourth and the fifth extended flat sides are symmetrical with each other about the major axis of the oval, and the third extended flat side and the curved section are each symmetrical along the major axis of the oval, such that the cross-sectional shape of the one or more inner poles is symmetrical about the major axis of the oval. In some embodiments, the curved section does not contain any flat sides, such that the cross-sectional shape of the one or more inner poles is asymmetrical about the minor axis of the oval. In alternative embodiments, the curved section contains three short flat sides, wherein a first, a second, and a third short flat sides are on a symmetrical position of the third, the fourth and the fifth extended flat sides respectively, relative to the minor axis of the oval; and the first, the second, and the third short flat sides are shorter than the third, the fourth, and the fifth extended flat sides respectively, such that the cross-sectional shape of the one or more inner poles is asymmetrical about the minor axis of the oval.

The outer and inner poles of the extendible pole can be slidably connected by any means known in the art. The extendible pole can be manufactured to any dimensions and by any suitable materials according to its use.

The objects and advantages of the disclosure will appear more fully from the following detailed description of the preferred embodiment of the disclosure made in conjunction with the accompanying drawings.

DETAILED DESCRIPTION OF THE INVENTION

Disclosed herein is an extendable pole comprising an outer pole and one or more inner poles slidably engaged within the outer pole. The cross-sectional shapes of the outer and inner poles are configured to an oval with flat sides. This configuration increases the hand fit and rigidity of the extendible pole.

Figures 1A, 1B:
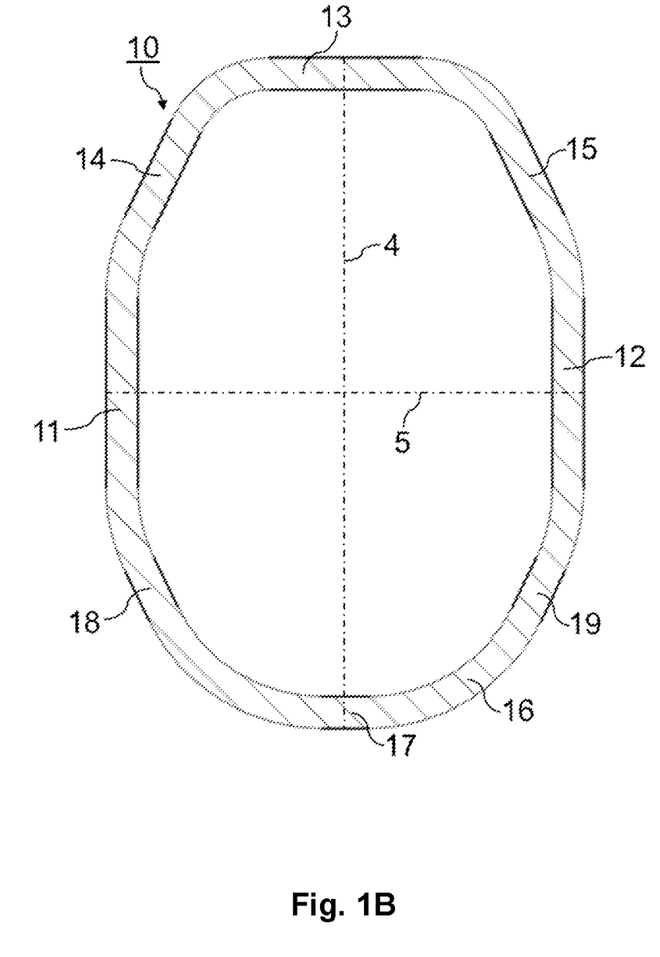
FIGS. 1A-1B show exemplary cross-sectional shapes of an outer pole of the extendible pole according to the present disclosure.

Exemplary cross-sectional shapes of the outer pole according to the present disclosure are shown in FIGS. 1A and 1B. The cross-sectional shape 1 as shown in FIG. 1A is an oval having at an upper portion thereof five extended flat sides 11, 12, 13, 14, and 15. The first and the second extended flat sides 11 and 12 are on a left and a right side of the oval respectively and parallel with the major axis 4 of the oval. The third extended flat side 13 is on a top side of the oval and parallel with the minor axis 5 of the oval. The fourth and the fifth extended flat sides 14 and 15 connect the third extended flat side 13 with the first and the second extended flat sides 11 and 12 respectively. Preferably, the fourth and the fifth extended flat sides 14 and 15 connect the third extended flat side 13 with the first and the second extended flat sides 11 and 12 respectively with rounded corners, as shown in FIG. 1A. At a lower portion of the cross-sectional shape 1 is a curved section 16 that connects the first and the second extended flat sides 11 and 12.

In the cross-sectional shape 1 as shown in FIG. 1A, the first and the second extended flat sides 11 and 12 are symmetrical with each other about the major axis 4 of the oval, the fourth and the fifth extended flat sides 14 and 15 are symmetrical with each other about the major axis 4 of the oval, and the third extended flat side 13 and the curved section 16 are each symmetrical along the major axis 4 of the oval, such that the cross-sectional shape 1 of the outer pole is symmetrical about the major axis 4 of the oval.

In the embodiment as shown in FIG. 1A, the curved section 16 is completely rounded to retain the curve of the oval and does not contain any flat sides. Thus, the cross-sectional shape 1 is asymmetric about the minor axis 5. Alternatively, the cross-sectional shape 10 as shown in FIG. 1B has identical extended flat sides 11, 12, 13, 14, and 15 at the upper portion of the oval as the cross-sectional shape 1, but the curved section 16 of the cross-sectional shape 10 comprises three short flat sides 17, 18, and 19. The short flat sides 17, 18, and 19 are on a symmetrical position of the extended flat sides 13, 14, and 15 respectively, relative to the minor axis 5 of the oval. The short flat sides 17, 18, and 19 are shorter than the extended flat sides 13, 14, and 15 respectively, such that the curved section 16 in FIG. 1B retains most of the curve of the oval and the cross-sectional shape 10 is still asymmetrical about the minor axis 5 of the oval.

Figure 2A:
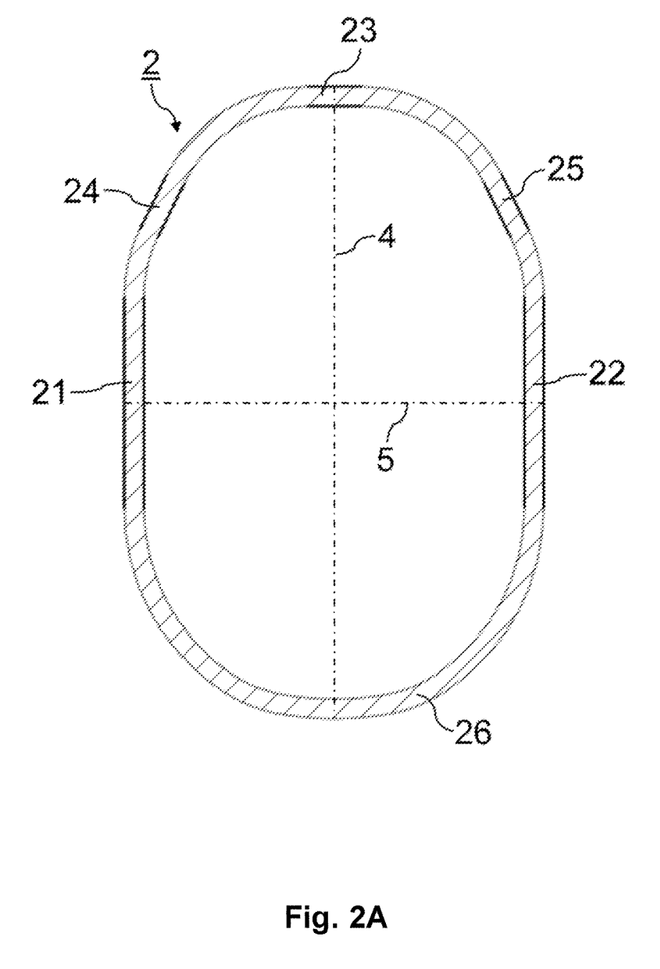
FIGS. 2A-2D show exemplary cross-sectional shapes of an inner pole of the extendible pole according to the present disclosure.

Exemplary cross-sectional shapes of the one or more inner poles according to the present disclosure are shown in FIGS. 2A-2D. The cross-sectional shape 2 as shown in FIG. 2A is an oval having at an upper portion thereof two extended flat sides 21 and 22 and three short flat sides 23, 24, and 25. The first and the second extended flat sides 21 and 22 are on a left and a right side of the oval respectively and parallel with the major axis 4 of the oval. The first short flat side 23 is on a top side of the oval and parallel with the minor axis 5 of the oval. The second and the third short flat sides 24 and 25 are on the curves that connect the first short flat side 23 with the first and the second extended flat sides 21 and 22 respectively. The short flat sides 23, 24, and 25 are shorter than the extended flat sides 21 and 22. At a lower portion of the cross-sectional shape 2 is a curved section 26 that connects the first and the second extended flat sides 21 and 22.

In the cross-sectional shape 2 as shown in FIG. 2A, the first and the second extended flat sides 21 and 22 are symmetrical with each other about the major axis 4 of the oval, the second and the third short flat sides 24 and 25 are symmetrical with each other about the major axis 4 of the oval, and the first short flat side 23 and the curved section 26 are each symmetrical along the major axis 4 of the oval, such that the cross-sectional shape 2 of the inner pole is symmetrical about the major axis 4 of the oval.

Figure 2B:
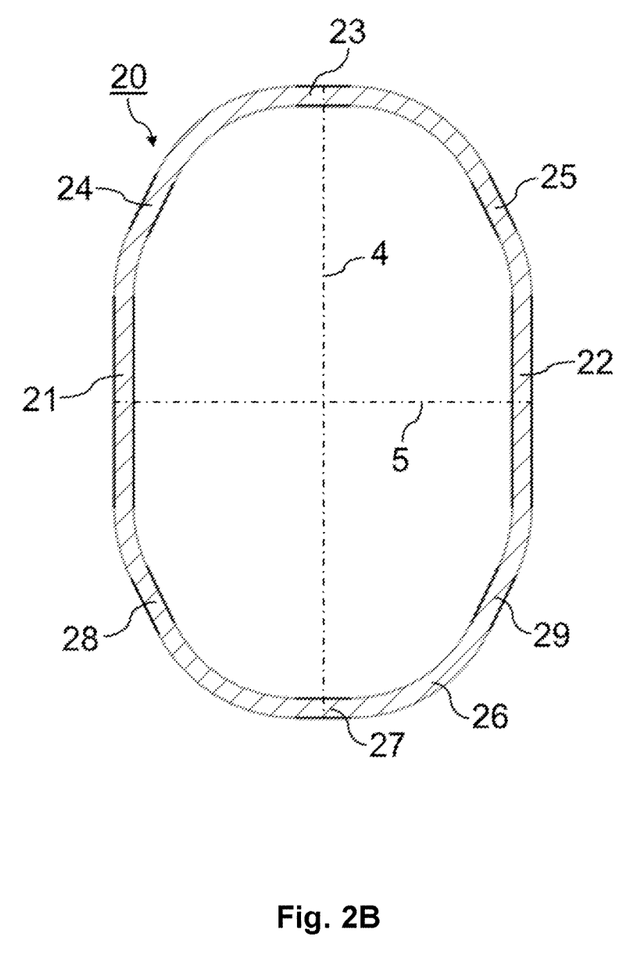

In the embodiment as shown in FIG. 2A, the curved section 26 is completely rounded to retain the curve of the oval and does not contain any flat sides. Thus, the cross-sectional shape 2 is asymmetric about the minor axis 5 of the oval. Alternatively, the cross-sectional shape 20 as shown in FIG. 2B has identical extended flat sides 21 and 22 and short flat sides 23, 24, and 25 at the upper portion of the oval as the cross-sectional shape 2, but the curved section 26 of the cross-sectional shape 20 comprises three short flat sides 27, 28, and 29. The short flat sides 27, 28, and 29 are symmetrical to the short flat sides 23, 24, and 25 respectively, relative to the minor axis 5 of the oval. Thus, the cross-sectional shape 20 is symmetrical about both the major axis 4 and the minor axis 5 of the oval.

Figure 2C:
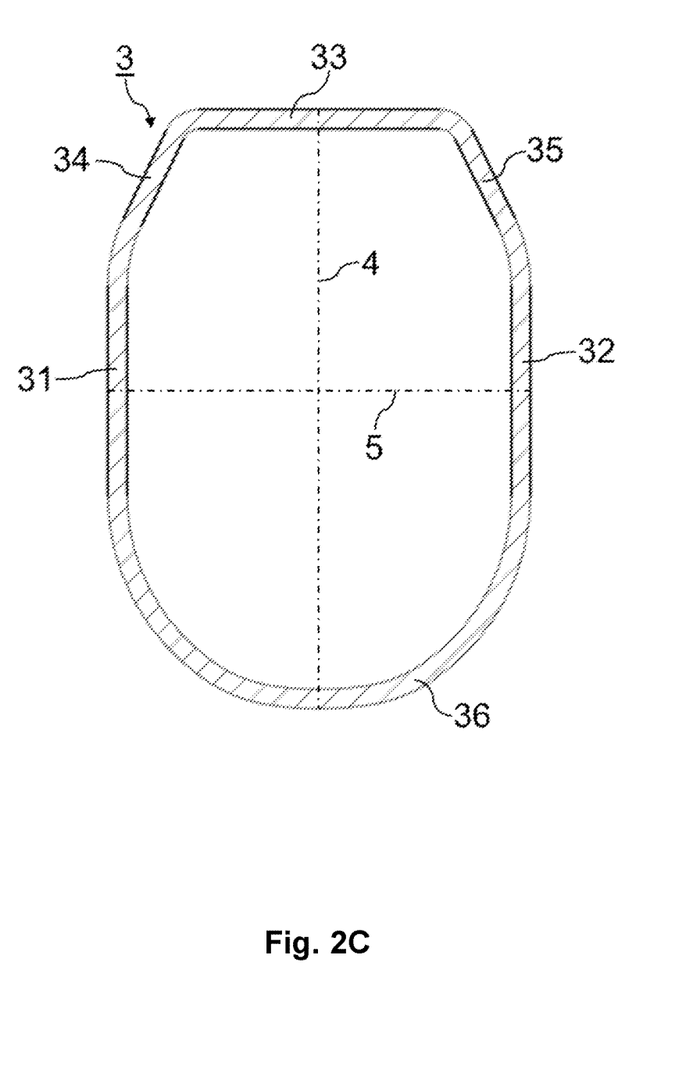

The cross-sectional shape 3 as shown in FIG. 2C is an oval having at an upper portion thereof five extended flat sides 31, 32, 33, 34, and 35. The first and the second extended flat sides 31 and 32 are on a left and a right side of the oval respectively and parallel with the major axis 4 of the oval. The third extended flat side 33 is on a top side of the oval and parallel with the minor axis 5 of the oval. The fourth and the fifth extended flat sides 34 and 35 connect the third extended flat side 33 with the first and the second extended flat sides 31 and 32 respectively. Preferably, the fourth and the fifth extended flat sides 34 and 35 connect the third extended flat side 33 with the first and the second extended flat sides 31 and 32 respectively with rounded corners, as shown in FIG. 2C. At a lower portion of the cross-sectional shape 3 is a curved section 36 that connects the first and the second extended flat sides 31 and 32.

In the cross-sectional shape 3 as shown in FIG. 2C, the first and the second extended flat sides 31 and 32 are symmetrical with each other about the major axis 4 of the oval, the fourth and the fifth extended flat sides 34 and 35 are symmetrical with each other about the major axis 4 of the oval, and the third extended flat side 33 and the curved section 36 are each symmetrical along the major axis 4 of the oval, such that the cross-sectional shape 3 of the inner pole is symmetrical about the major axis 4 of the oval.

Figure 2D:
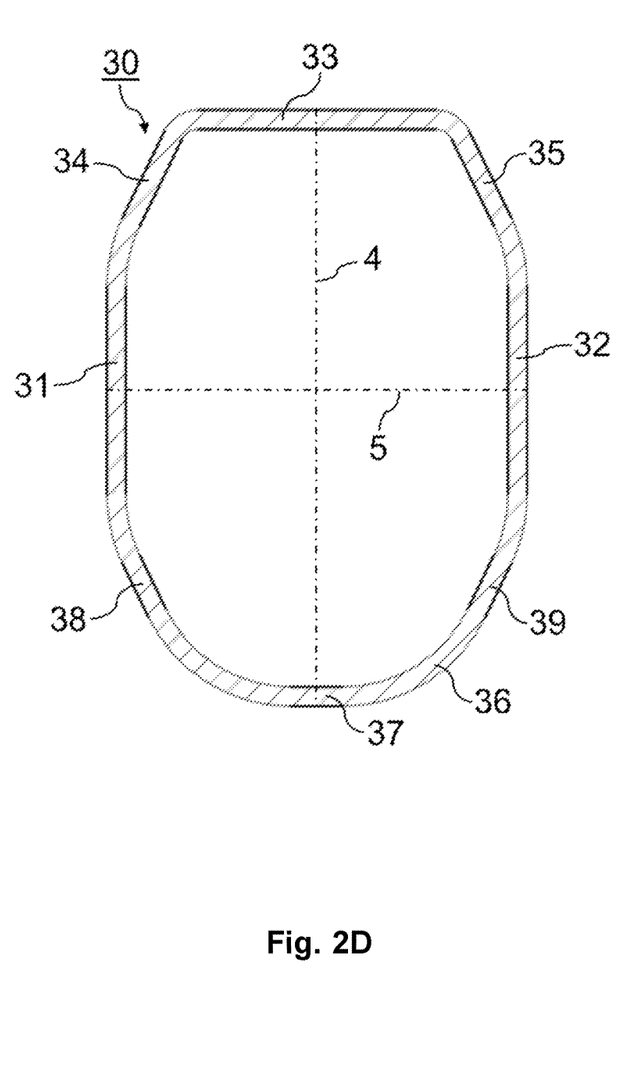

In the embodiment as shown in FIG. 2C, the curved section 36 is completely rounded to retain the curve of the oval and does not contain any flat sides. Thus, the cross-sectional shape 3 is asymmetrical about the minor axis 5 of the oval. Alternatively, the cross-sectional shape 30 as shown in FIG. 2D has identical extended flat sides 31, 32, 33, 34, and 35 at the upper portion of the oval as the cross-sectional shape 3, but the curved section 36 of the cross-sectional shape 30 comprises three short flat sides 37, 38, and 39. The short flat sides 37, 38, and 39 are on a symmetrical position of the extended flat sides 33, 34, and 35 respectively, relative to the minor axis 5 of the oval. The short flat sides 37, 38, and 39 are shorter than the extended flat sides 33, 34, and 35 respectively, such that the curved section 36 in FIG. 2D retains most of the curve of the oval and the cross-sectional shape 30 is still asymmetrical about the minor axis 5 of the oval.

The cross-sectional shape of an oval with flat sides, especially the configuration with five extended flat sides at the upper portion and a curved section at the lower portion, allows for increased rigidity and hand fit of the extendible pole. The poles having the flat surfaces aid in stiffness in the extended form. The curved section of the shape fits the user's hand and increases comfort of holding the pole. The short flat sides on the curved section further increase the rigidity of the extendible pole, and at the same time retains most of the curves of the oval to allow comfort holding of the pole.

The extendible pole according to the present disclosure comprises an outer pole and one or more inner poles slidably engaged within the outer pole. The cross-sectional shape of the outer pole can be any of the cross-sectional shapes 1 and 10 as shown in FIGS. 1A and 1B. The cross-sectional shape of the one or more inner poles can be any of the cross-sectional shapes 2, 20, 3, and 30 as shown in FIGS. 2A-2D. The cross-sectional shapes of the outer pole and the one or more inner poles are aligned to the same major axis 4 and minor axis 5.

For illustrative purposes, two exemplary extendible poles 100 and 200 are shown herein, but combinations of the cross-sectional shapes of the outer and inner poles of the extendible pole disclosed herein are not limited to the exemplary embodiments 100 and 200.

Figure 3:
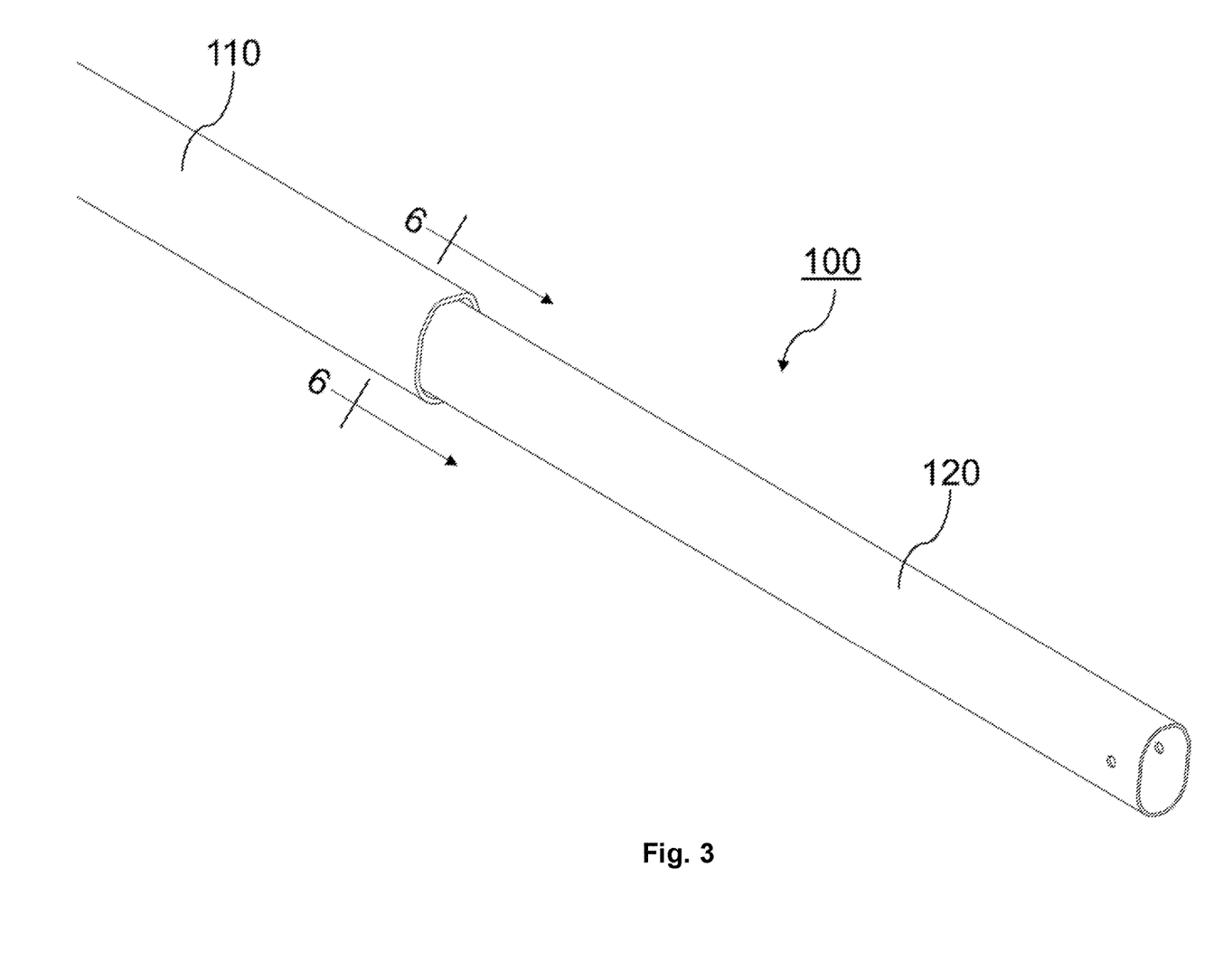
FIG. 3 is a perspective view of a first exemplary embodiment of the extendible pole according to the present disclosure.
Figure 4:
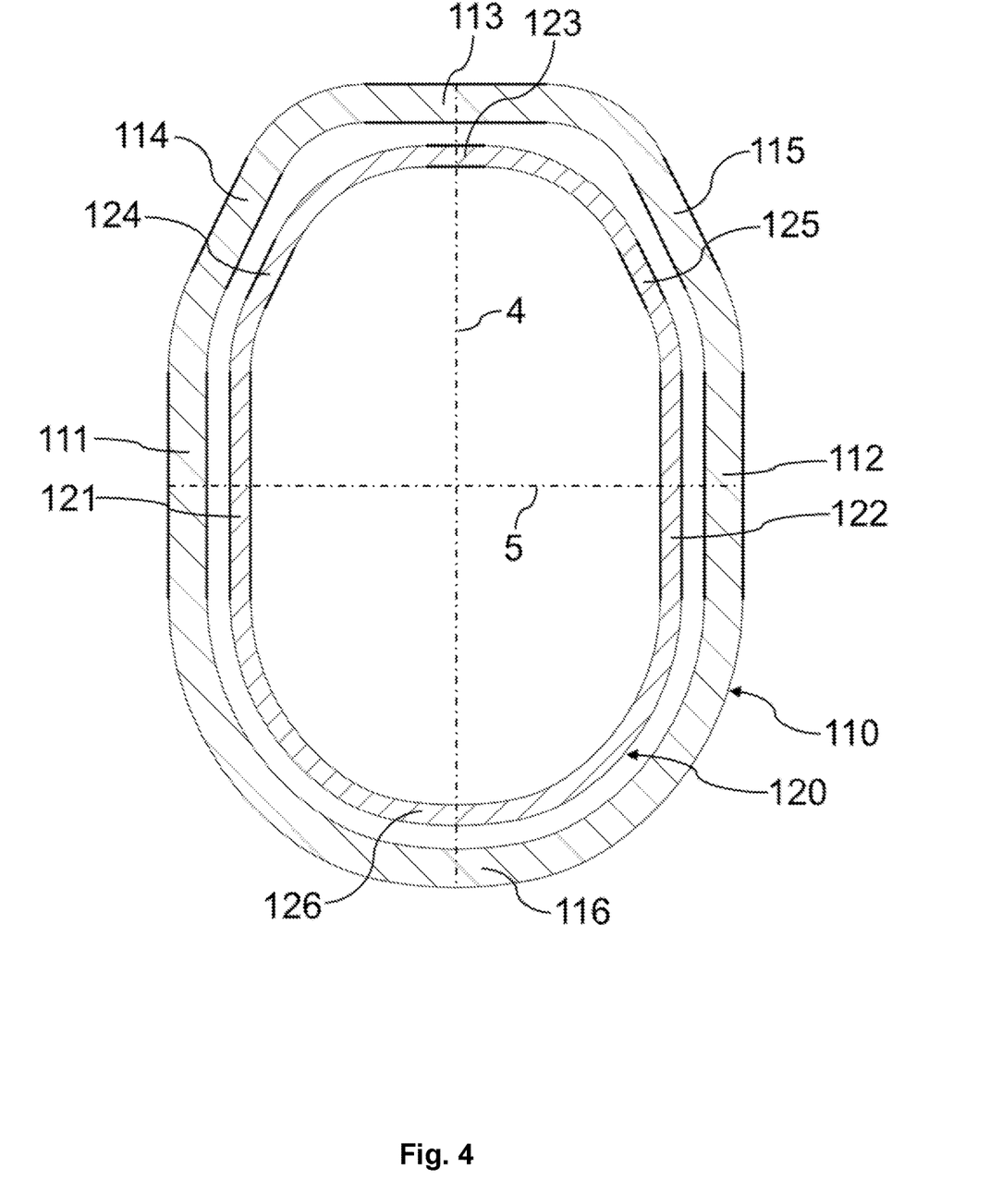
FIG. 4 is a cross-sectional view of the first exemplary embodiment of the extendible pole according to the present disclosure taken at lines 6-6 of FIG. 3, wherein the curved sections of the outer pole and the inner pole do not contain any flat sides. Flat sides of the cross-sectional shapes of the extendible pole are shown in bold lines.
Figure 5:
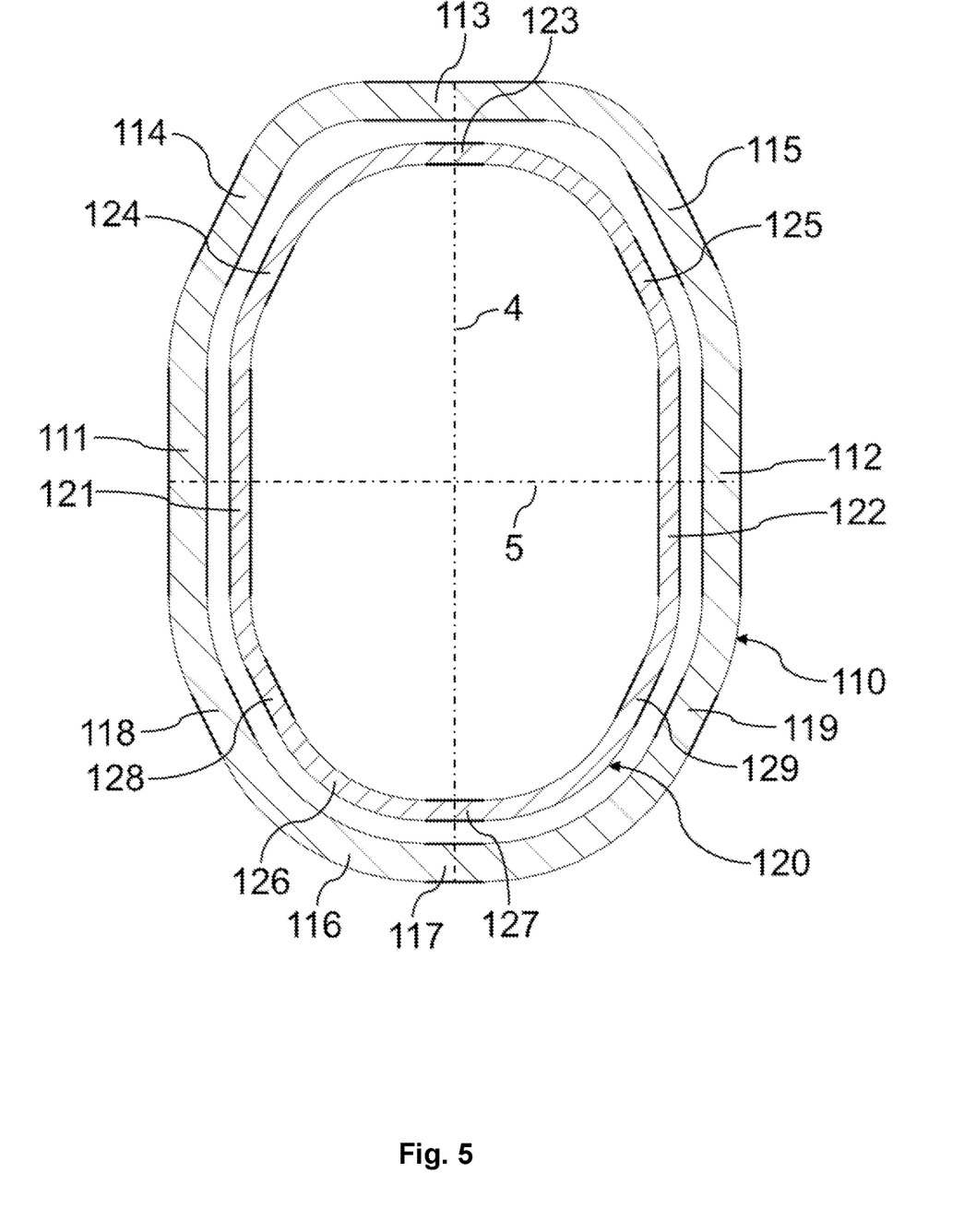
FIG. 5 is a cross-sectional view of the first exemplary embodiment of the extendible pole according to the present disclosure taken at lines 6-6 of FIG. 3, wherein the curved sections of the outer pole and the inner pole each contains three short flat sides. Flat sides of the cross-section shapes of the extendible pole are shown in bold lines.

As shown in FIGS. 3-5, a first exemplary embodiment of the disclosure includes an extendible pole 100 comprising an outer pole 110 and an inner pole 120, wherein the inner pole 120 is slidably engaged within the outer pole 110. As shown in FIG. 4, the outer pole 110 has a cross-sectional shape of the cross-sectional shape 1 and the inner pole 120 has a cross-sectional shape of the cross-sectional shape 2. Specifically, the outer pole 110 has a cross-sectional shape of an oval with five extended flat sides 111, 112, 113, 114, and 115 at an upper portion thereof and a curved section 116 at a lower portion thereof. The inner pole 120 has a cross-sectional shape of an oval with two extended flat sides 121 and 122 and three short flat sides 123, 124, and 125 at an upper portion thereof, and a curved section 126 at a lower portion thereof. In the embodiment shown in FIG. 4, the curved sections 116 and 126 are completely rounded to retain the curves of the ovals and do not contain any flat sides.

Alternatively, as shown in FIG. 5, the outer pole 110 has a cross-sectional shape of the cross-sectional shape 10 and the inner pole 120 has a cross-sectional shape of the cross-sectional shape 20. Specifically, the same as the flat sides at the upper portion as shown in FIG. 4, the outer pole 110 has five extended flat sides 111, 112, 113, 114, and 115 at the upper portion; and the outer pole 120 has two flat sides 121 and 122 and three short flat sides 123, 124, and 125 at the upper portion. But in the embodiment shown in FIG. 5, the curved section 116 comprises three short flat sides 117, 118, and 119, and the curved section 126 comprises three short flat sides 127, 128, and 129.

Figure 6:
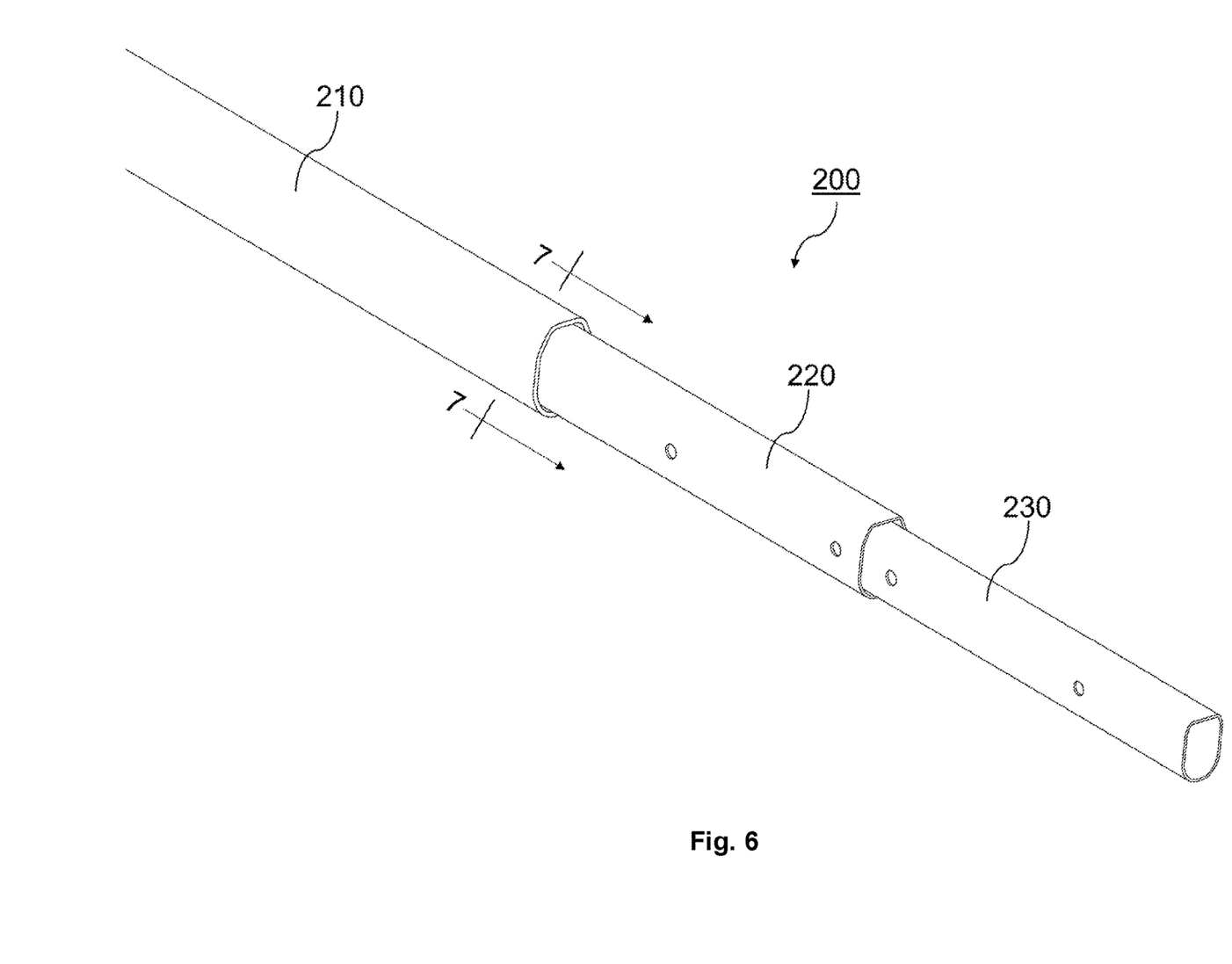
FIG. 6 is a perspective view of a second exemplary embodiment of the extendible pole according to the present disclosure.
Figure 7:
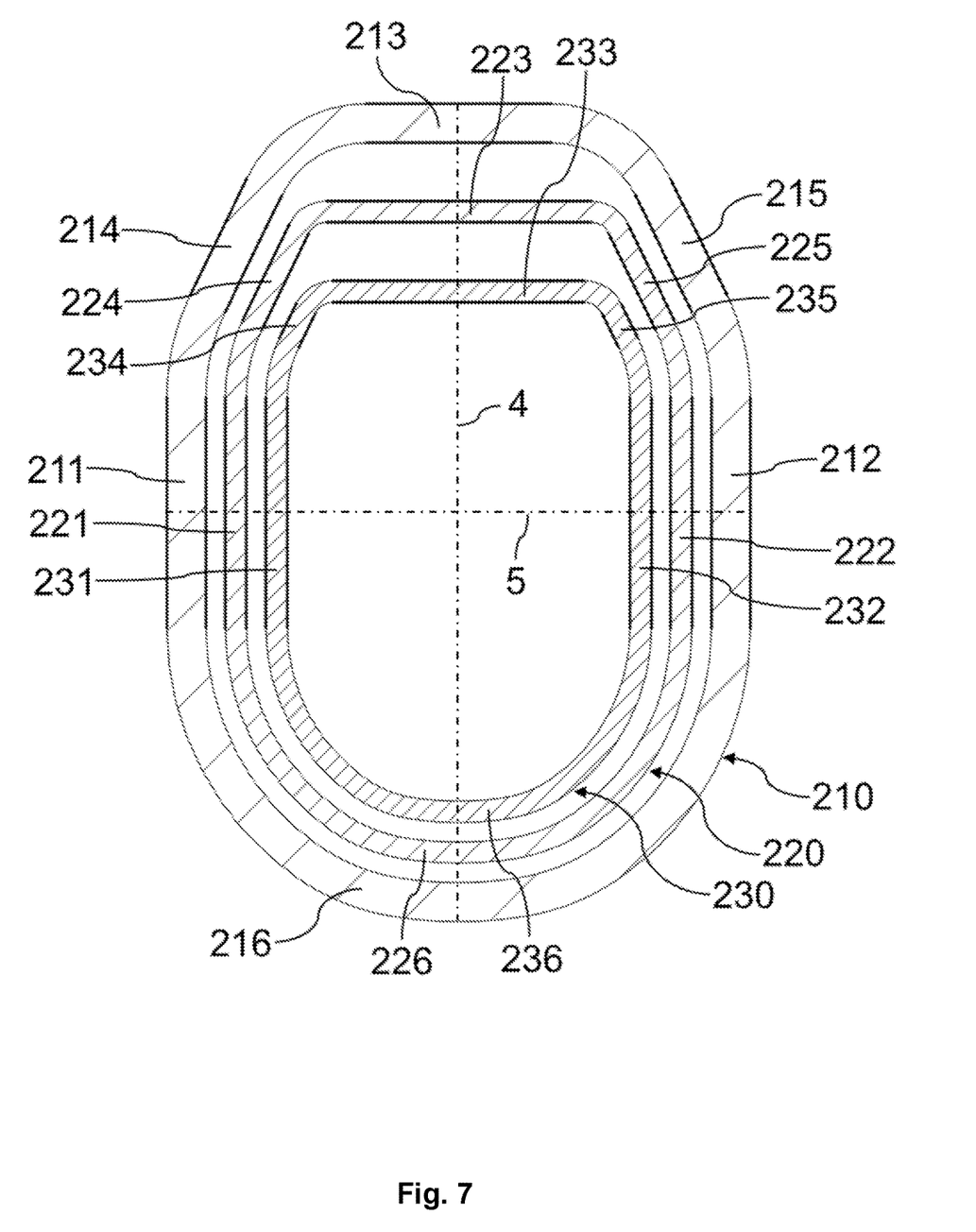
FIG. 7 is a cross-sectional view of the second exemplary embodiment of the extendible pole according to the present disclosure taken at lines 7-7 of FIG. 6, wherein the curved sections of the outer pole and the inner poles do not contain any flat sides. Flat sides of the cross-sectional shapes of the extendible pole are shown in bold lines.
Figure 8:
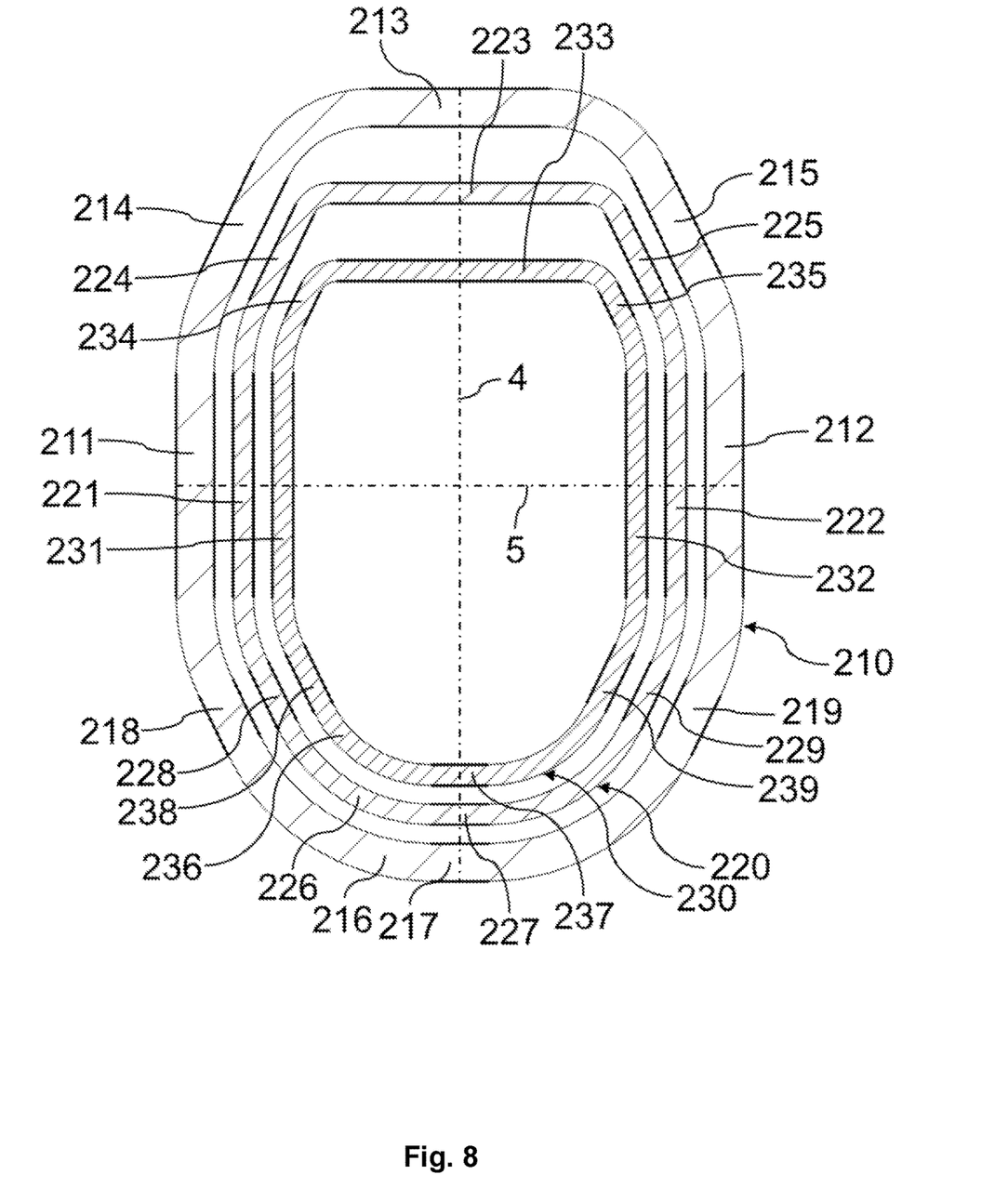
FIG. 8 is a cross-sectional view of the second exemplary embodiment of the extendible pole according to the present disclosure taken at lines 7-7 of FIG. 6, wherein the curved sections of the outer pole and the inner poles each contains three short flat sides. Flat sides of the cross-sectional shapes of the extendible pole are shown in bold lines.

As shown in FIGS. 6-8, a second exemplary embodiment of the disclosure includes an extendible pole 200 comprising an outer pole 210, a first inner pole 220, and a second inner pole 230, wherein the first inner pole 220 is slidably engaged within the outer pole 210, and the second inner pole 230 is slidably engaged within the first inner pole 220. As shown in FIG. 7, the outer pole 210 has a cross-sectional shape of the cross-sectional shape 1 and the first inner pole 220 and the second inner pole 230 each has a cross-sectional shape of the cross-sectional shape 3. Specifically, the outer pole 110 has a cross-sectional shape of an oval with five extended flat sides 211, 212, 213, 214, and 215 at an upper portion thereof, and a curved section 216 at a lower portion thereof. The first inner pole 220 has a cross-sectional shape of an oval with five extended flat sides 221, 222, 223, 224, and 225 at an upper portion thereof, and a curved section 226 at a lower portion thereof. The second inner pole 230 has a cross-sectional shape of an oval with five extended flat sides 231, 232, 233, 234, and 235 at an upper portion thereof, and a curved section 236 at a lower portion thereof. In the embodiment shown in FIG. 7, the curved sections 216, 226, and 236 are completely rounded to retain the curves of the oval and do not contain any flat sides.

Alternatively, as shown in FIG. 8, the outer pole 210 has a cross-sectional shape of the cross-sectional shape 10, and the first inner pole 220 and the second inner pole 230 each has a cross-sectional shape of the cross-sectional shape 30. Specifically, the same as the flat sides at the upper portion as shown in FIG. 7, the outer pole 210 has five extended flat sides 211, 212, 213, 214, and 215 at the upper portion; the first inner pole 220 has five extended flat sides 221, 222, 223, 224, and 225 at the upper portion; and the second inner pole 230 has five extended flat sides 231, 232, 233, 234, and 235 at the upper portion. But in the embodiment shown in FIG. 8, the curved section 216 comprises three short flat sides 217, 218, and 219; the curved section 226 comprises three short flat sides 227, 228, and 229; and the curved section 236 comprises three short flat sides 237, 238, and 239.

In various versions of the disclosure, the extendible pole may comprise more than one or two inner poles as shown in the exemplary extendible poles 100 and 200. The cross-sectional shape of each of the inner poles can be any of the cross-sectional shape 2, 20, 3, and 30 as shown in FIGS. 2A-2D.

The outer and inner poles of the extendible pole as disclosed herein can be slidably connected by any means known in the art. The extendible pole can be manufactured to any dimensions according to its use. The extendible pole can be manufactured by any suitable materials according to its use, such as aluminum, stainless steel, polycarbonate, plastics, wood, etc. The extendible poles disclosed herein can be used for a variety of devices and tools. Examples include, but are not limited to, tree pruners, painting rollers, cleaning brushes, and tripods.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations and systems described herein may be used alone or in combination with other configurations and systems. It is to be expected that various equivalents, alternatives and modifications are possible within the scope of the foregoing description.

Any version of any component of the disclosure may be used with any other component of the disclosure. The elements described herein can be used in any combination whether explicitly described or not.

As used herein, the singular forms "a," "an," and "the" include plural referents unless the content clearly dictates otherwise.

As used herein, the term "or" is an inclusive "or" operator and is equivalent to the term "and/or" unless the context clearly dictates otherwise.

The systems of the present disclosure can comprise, consist of, or consist essentially of the essential elements and limitations described herein, as well as any additional or optional components, or limitations described herein or otherwise useful in the art. The disclosure provided herein suitably may be practiced in the absence of any element which is not specifically disclosed herein.

While this disclosure may be embodied in many forms, what is described in detail herein is a specific preferred embodiment of the disclosure. The present disclosure is an exemplification of the principles of the disclosure is not intended to limit the disclosure to the particular embodiments illustrated. It is to be understood that this disclosure is not limited to the particular examples, configurations, and materials disclosed herein as such configurations and materials may vary somewhat. It is also understood that the terminology used herein is used for the purpose of describing particular embodiments only and is not intended to be limiting since the scope of the present disclosure will be limited to only the appended claims and equivalents thereof

What is claimed is:

1. An extendible pole comprising:
    an outer pole having a cross-sectional shape of an oval with five extended flat sides at an upper portion thereof and a curved section at a lower portion thereof, wherein a first and a second extended flat sides are on a left and a right side of the oval respectively and parallel with the major axis of the oval; a third extended flat side is on a top side of the oval and parallel with the minor axis of the oval; and a fourth and a fifth extended flat sides connect the third extended flat side with the first and the second extended flat sides respectively; and
    one or more inner poles slidably engaged within the outer pole,
    wherein the curved section contains three short flat sides, wherein a first, a second, and a third flat sides are on a symmetrical position of the third, the fourth and the fifth extended flat sides respectively, relative to the minor axis of the oval; and the first, the second, and the third short flat sides are shorter than the third, the fourth, and the fifth extended flat sides respectively, such that the cross-sectional shape of the outer pole is asymmetrical about the minor axis of the oval.

2. The extendible pole of claim 1, wherein the fourth and the fifth extended flat sides connect the third extended flat side with the first and the second extended flat sides respectively with rounded corners.

3. The extendible pole of claim 1, wherein the first and the second extended flat sides are symmetrical with each other about the major axis of the oval, the fourth and the fifth extended flat sides are symmetrical with each other about the major axis of the oval, and the third extended flat side and the curved section are each symmetrical along the major axis of the oval, such that the cross-sectional shape of the outer pole is symmetrical about the major axis of the oval.

4. The extendible pole of claim 1, wherein the one or more inner poles each has a cross-sectional shape of an oval with two extended flat sides and three short flat sides at an upper portion thereof and a curved section at a lower portion thereof, wherein a first and a second extended flat sides are on a left and a right side of the oval respectively and parallel with the major axis of the oval; a first short flat side is on a top side of the oval and parallel with the minor axis of the oval; a second and a third short flat sides are on curves connecting the first short flat side with the first and the second extended flat sides respectively; and the three short flat sides are shorter than the two extended flat sides.

5. The extendible pole of claim 4, wherein the first and the second extended flat sides are symmetrical with each other about the major axis of the oval, the second and the third short flat sides are symmetrical with each other about the major axis of the oval, and the first short flat side and the curved section are each symmetrical along the major axis of the oval, such that the cross-sectional shape of the one or more inner poles is symmetrical about the major axis of the oval.

6. The extendible pole of claim 5, wherein the curved section does not contain any flat sides, such that the cross-sectional shape of the one or more inner poles is asymmetrical about the minor axis of the oval.

7. The extendible pole of claim 5, wherein the curved section contains three short flat sides, wherein a first, a second, and a third short flat sides of the curved section are symmetrical with the first, the second, and the third short flat sides of the upper portion respectively, relative to the minor axis of the oval, such that the cross-sectional shape of the one or more inner poles is symmetrical about the minor axis of the oval.

8. The extendible pole of claim 1, wherein the one or more inner poles each has a cross-sectional shape of an oval with five extended flat sides at an upper portion thereof and a curved section at a lower portion thereof, wherein a first and a second extended flat sides are on a left and a right side of the oval respectively and parallel with the major axis of the oval; a third extended flat side is on a top side of the oval and parallel with the minor axis of the oval; and a fourth and a fifth extended flat sides connect the third extended flat side with the first and the second extended flat sides respectively.

9. The extendible pole of claim 8, wherein a fourth and a fifth extended flat sides connect the third extended flat side with the first and the second extended flat sides respectively with rounded corners.

10. The extendible pole of claim 8, wherein the first and the second extended flat sides are symmetrical with each other about the major axis of the oval, the fourth and the fifth extended flat sides are symmetrical with each other about the major axis of the oval, and the third extended flat side and the curved section are each symmetrical along the major axis of the oval, such that the cross-sectional shape of the one or more inner poles is symmetrical about the major axis of the oval.

11. The extendible pole of claim 10, wherein the curved section does not contain any flat sides, such that the cross-sectional shape of the one or more inner poles is asymmetrical about the minor axis of the oval.

12. The extendible pole of claim 10, wherein the curved section contains three short flat sides, wherein a first, a second, and a third short flat sides are on a symmetrical position of the third, the fourth and the fifth extended flat sides respectively, relative to the minor axis of the oval; and the first, the second, and the third short flat sides are shorter than the third, the fourth, and the fifth extended flat sides respectively, such that the cross-sectional shape of the one or more inner poles is asymmetrical about the minor axis of the oval.

* * * * *